(12) United States Patent
Guler et al.

(10) Patent No.: US 8,046,279 B2
(45) Date of Patent: Oct. 25, 2011

(54) SYSTEM AND METHOD FOR COMPARING RESULTS OF MULTIPLE LOT AUCTIONS USING DIFFERENT SEQUENCING RULES

(75) Inventors: Kemal Guler, Cupertino, CA (US); Hsiu-Khuern Tang, Menlo Park, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1799 days.

(21) Appl. No.: 10/757,323

(22) Filed: Jan. 14, 2004

(65) Prior Publication Data

US 2005/0154667 A1 Jul. 14, 2005

(51) Int. Cl.
*G06Q 40/00* (2006.01)
(52) U.S. Cl. .................................................... 705/35
(58) Field of Classification Search ................ 705/35–45
See application file for complete search history.

(56) References Cited

U.S. PATENT DOCUMENTS

| | | | |
|---|---|---|---|
| 5,809,282 A * | 9/1998 | Cooper et al. | 709/226 |
| 7,110,976 B2 * | 9/2006 | Heimermann et al. | 705/37 |
| 2001/0027434 A1 | 10/2001 | Alaia et al. | |
| 2001/0032173 A1 | 10/2001 | Alaia et al. | |
| 2001/0037285 A1 | 11/2001 | Alaia et al. | |
| 2002/0032621 A1 | 3/2002 | Smith et al. | |
| 2002/0042769 A1 | 4/2002 | Gujral et al. | |
| 2002/0046148 A1 | 4/2002 | Alaia et al. | |
| 2002/0049664 A1 | 4/2002 | Hoffman et al. | |
| 2002/0077959 A1 | 6/2002 | Alaia et al. | |
| 2002/0116316 A1 | 8/2002 | Griffiths | |
| 2003/0158804 A1 | 8/2003 | Francis et al. | |
| 2004/0006503 A1 * | 1/2004 | Jarvis | 705/10 |

OTHER PUBLICATIONS

Dumas et al., A Probabilistic Approach to Automated Bidding in Alternative Auctions, International World Wide Web Conference, ACM Press, 2002, pp. 99-108.*
Pinker et al., Using Transaction Data for the Design of Sequential, Multi-Unit Online Auctions, University of Rochester, William E. Simon Graduate School of Business Administration, Computer and Information Working Paper Series No. CIS 00-03, Oct. 2001.*
Wurman et al., Specifying Rules for Electronic Auctions, Jul. 11, 2002.*
"An Insider's Guide to Online Reverse Auctions," Q2 2002 Procurement Insight Contents, Silver Oak Solutions, Quarterly Newsletter—Q2 2002, 4 pp.

* cited by examiner

*Primary Examiner* — Charles Kyle
*Assistant Examiner* — Clifford Madamba

(57) ABSTRACT

A system and method comprises simulating a multiple lot auction using a sequencing rule until bidding on all lots is closed, simulating the multiple lot auction using a different sequencing rule until bidding on all lots is closed, and comparing results of the simulated auctions with both sequencing rules.

22 Claims, 2 Drawing Sheets

SYSTEM AND METHOD FOR COMPARING RESULTS OF MULTIPLE LOT AUCTIONS USING DIFFERENT SEQUENCING RULES

BACKGROUND

In multiple lot auctions, the purchase or sale of multiple lots of items (goods or services) are auctioned. Such auctions may be conducted with various sequencing and/or closing rules. Closing rules specify (1) an initial closing time (a time after which bids are not accepted) for each lot and (2) how these times were modified during the auction based on bidding activity. Sequencing rules determine how the closing times are ordered among the various lots. For example, the bidding on all of the lots may begin simultaneously, but the closing time for the lots may be staggered. For example, lot 1 may close bidding after 30 minutes, lot 2 may close bidding 15 minutes after that, and so on. Alternatively, the lots may be auctioned sequentially, one lot after another. In general, bidding behavior is influenced by the sequencing of the closing times and order of the various lots. The entity conducting the auction naturally desires an optimal strategy for implementing an auction.

BRIEF SUMMARY

In accordance with at least some embodiments, a system and method comprises simulating a multiple lot auction using a sequencing rule until bidding on all lots is closed, simulating the multiple lot auction using a different sequencing rule until bidding on all lots is closed, and comparing results of the simulated auctions with both sequencing rules.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
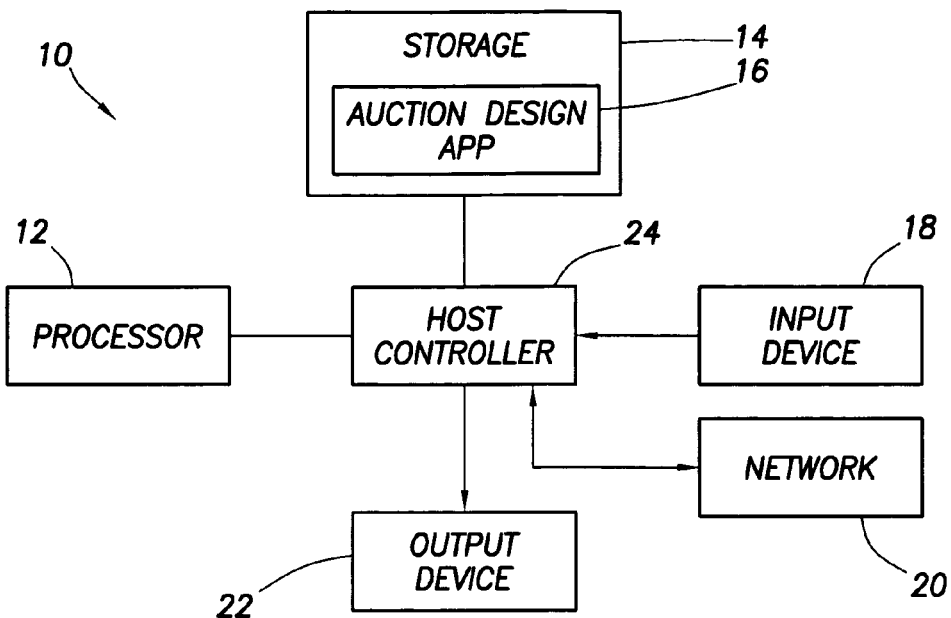
FIG. 1 shows a system in accordance with exemplary embodiments of the invention.

FIG. 1 shows an exemplary embodiment of a system 10 adapted to simulate auctions in accordance with various embodiments as disclosed herein. As shown, system 10 includes a processor 12, storage 14, an input device 18, a network connection 20, and an output device 22 coupled together via a host controller 24. The storage 14 may be collectively representative of random access memory ("RAM"), a hard disk drive, CD-ROM or other forms of data and application storage. The input device 18 may comprise any suitable type of mechanism by which a user can provide input to and/or control the operation of the system 10. By way of examples, the input device may comprise a keyboard, mouse, or trackball. The output device 22 may comprise any suitable type of display. The system 10 may interface to a network (e.g., a local or wide area network) via the network connection 20. Via the network connection, the system 10 may be provided with access to remotely stored auction-related data.

In accordance with embodiments of the invention, an auction design application 16 is stored in storage 14 and executed by the processor 12. The auction design application implements most or all of the functionality described herein. In general, the auction design application 16 permits a multiple lot auction to be simulated so that different sequencing rules can be evaluated. The simulated auctions may be reverse or forward auctions. Merely for purpose of explanation, the simulated auction referred to below will be explained in the context of a reverse auction. In a reverse auction, suppliers bid for the opportunity to sell goods or services to a purchaser. Usually, the winning bid is the lowest bid. The simulated auctions may be multiple lot auctions. A multiple lot auction comprises a plurality of lots wherein each lot contains one or more goods or services on which to bid. The individual lots may vary by the quantity of a single item. For example, lot A may contain 60 units of 20 gigabyte hard disk drives while lot B may contain 40 units of 20 gigabyte hard disk drives. The lots also may vary by the items contained therein. For example, lot C may contain 70 units of 40 gigabyte hard disk drives, while lot D may contain 70 units of 80 gigabyte hard disk drives.

In general, an auction is implemented in accordance with various rules and parameters. Some of these rules and parameters may be coded directly into the auction design application 16 and other rules and parameters may be provided to the auction design application by way of input files. Using input files permits flexibility in running the simulation with different rules (e.g., sequencing rules) and parameters. Some of these rules and parameters are discussed below.

Closing rules may vary from auction to auction. Closing rules are used to determine when bidding on a particular lot will close. A closing rule might be to close bidding on a lot at a predetermined time. For example, bidding might close on Friday at noon or 10 hours after bidding on the lot opens. Another closing rule may be based on activity. For an activity-based closing rule, bidding on a lot closes when no bids for the lot are received after a specified period of time. For example, bidding on a particular lot may close if no bid is received during any 10-minute period of time. In other auctions, a combination of fixed and activity-based closing rules may be applied.

Lot closings also may be sequenced. That is, closing times for individual auctions may vary. Sequenced lot closing may be fixed with respect to time meaning that bidding on different lots may cease at different scheduled times. Lot closings also may be sequenced according to activity-based rules. Bidding on a lot may close when there are no bids on that particular lot for a specified period of time before the scheduled closing time. Alternatively, bidding on a lot may close when there are no bids on any lot for a specified period of time before the most recent scheduled closing time. Further still, closing times of all open lots may be extended by a fixed amount of time if there is bidding activity within a specified period of time before the scheduled closing time.

The auction design application 16 may be used to simulate an auction with a particular set of sequencing rules. The results of the simulation may be examined and the simulation may be run with other sets of sequencing rules. The results of the simulated auctions with different sequencing rules may then be evaluated to determine the set of sequencing rules that should be used during the "live" auction. Any of a variety of metrics may be used when examining the results of the auction. Exemplary metrics that may be used include the total, average or mean cost of procurement on the part of the purchaser.

As noted above, various rules and parameters are used to implement an auction. Various exemplary sequencing rules are described above. In addition, the purchaser may not permit bidding on a particular pair (or more) of lots to be won by the same bidder. Such lots thus are referred to as being mutually exclusive or incompatible. For example, a purchaser may not want to "sole source" all of its 40 gigabyte hard drives with a single supplier. Thus, no supplier may be permitted to supply 40 gigabyte hard drives in more than one lot.

Various auction parameters may include a reserve price, starting price, minimum bid increments or decrements, whether proxy-bidding is permitted, information disclosure to the bidders, etc.

Further still, supplier and industry characteristics may influence bidder behavior. For example, a supplier may be willing to accept a lower total price to supply all of the units in two lots than the sum of the prices that the supplier would be willing to accept to supply the lots individually. This effect is referred to as "cost complementarities." Further, bidders have certain attitudes toward risk. As such, bidders generally trade off contract profits from selling the lots won versus the probability of winning the lots when deciding how to bid in a multiple lot auction.

Some, or all of the aforementioned rules and parameters are modeled or otherwise taken into consideration by the auction design application 16 when simulating an auction. These rules and parameters may be provided to the auction design application in accordance with any suitable model or form. For example, bidder's attitudes toward risk may be modeled in accordance with the constant absolute risk aversion ("CARA") parametric family. In the CARA parameterization, the utility value of $x profit is represented as:

$$u(x) = (1-e^{-\theta x})/(1-e^{-\theta x_0})$$

where $x_0$ is a reference profit level to ensure the normalization that $u(x_0)=1$. The parameter $\theta$ represents the attitude toward risk. Higher values of the parameter $\theta$ represents stronger aversion to risk. Alternative parametric utility functions may be employed in alternative embodiments of the proposed system.

A general cost function that incorporates fixed and variable costs, capacity constraints as well as cost complementarities can be modeled by the following equation which provides the joint cost function of a supplier:

$$C_s(q_1, \ldots, q_I) = A_s 1_{\{0 < \sum_{i=1}^I q_i\}} + \sum_{i=1}^I B_{si} 1_{\{q_i > 0\}} + \sum_{i=1}^I \alpha_{si} q_i^2/2 + \sum_{i=1}^I \left\{ q_i \beta_{si} + (q_i - K_{si})^+ \gamma_{si} + q_i \sum_{j \neq i} \chi_{sij} q_j \right\} + \delta_s \left( \sum_{j=1}^I q_j - \overline{K}_s \right)^+$$

where $(q_1, q_2, \ldots, q_I)$ is a vector of quantities for the l items;

$C_s(q_1, q_2, \ldots, q_I)$ is the total cost for supplier s of delivering the quantity combination designated by the vector $(q_1, q_2, \ldots, q_I)$;

$A_s$ is a supplier specific fixed cost incurred by supplier s if he wins any of the items;

$B_{si}$ is a supplier and item specific fixed cost that is incurred if supplier s supplies item i, that is if $q_i > 0$;

$K_{si}$ is a supplier specific capacity limit for supplier s for item i;

$\overline{K}_s$ is total capacity limit for supplier s;

and the parameters $\alpha$, $\beta$, $\gamma$, $\chi$ and $\delta$ represent the following features of variable costs:

$\alpha_{si}$ is the rate at which incremental cost of item i changes as the quantity of item increases;

$\beta_{si}$ is the intercept of the per unit cost for supplier s and i item;

$\gamma_{si}$ is the additional per unit cost supplier s incurs for item i if the quantity of item i exceeds the capacity limit;

$\delta_s$ is the additional per unit cost supplier s incurs for any item if the total quantity exceeds the total capacity limit;

$\chi_{sij}$ is the rate at which the per unit cost of item i changes when the quantity of item j increases.

In expression (2), the notation $(a)^+$ stands for max(0,a), and $1_{(x)}$ stands for a function that takes the value 1 if the statement x is true, and 0 otherwise.

Figure 4:
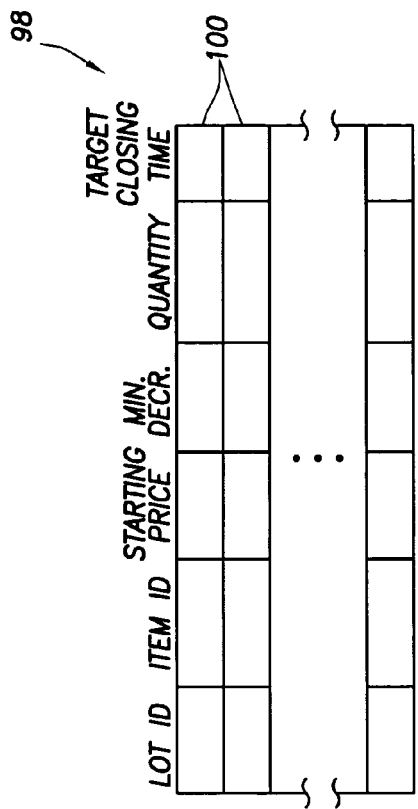
FIG. 4 depicts an exemplary lot file for use in the process of FIG. 2.

One or more inputs are provided to the auction design application 16. In accordance with at least some embodiments, the inputs to application 16 include the number of bidders, a lot file, and a cost file. The number of bidders may be one or more, but generally there will be at least two bidders. An exemplary structure for a lot file is shown in FIG. 4. As shown, lot file 98 includes a plurality of columns and a plurality of rows 100, one row for each lot to be auctioned. The columns may include lot identifier (ID), item ID, starting price, minimum bid decrement (for the case of reverse auctions), quantity, and target closing time. The lot identifier is a value that uniquely distinguishes one lot form all other lots being auctioned. The item ID uniquely distinguishes one type of item from another (e.g., 40 gigabyte hard drive, 60 gigabyte hard drive). The minimum decrement value refers to the bid value decrement that is permitted in a reverse auction. For example, a minimum bid decrement of one dollar means that a new bid must be lower than the current bid by at least one dollar. The quantity indicates the number of units being auctioned in the lot. If the entity setting up the auction desires to have a specific closing time, the target closing time can also be provided as shown.

Figure 5:
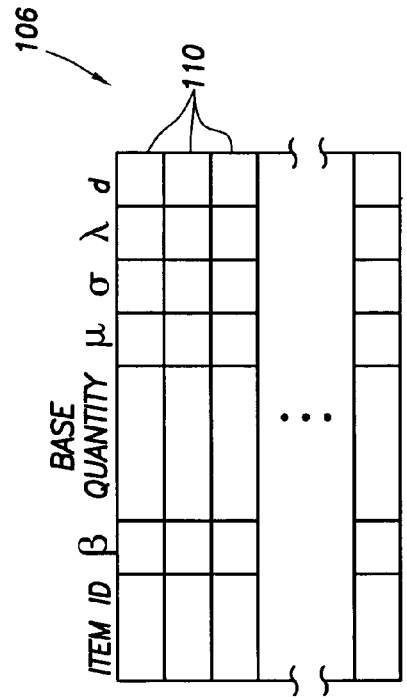
FIG. 5 depicts an exemplary cost file for use in the process of FIG. 2.

An exemplary structure for a cost file is shown in FIG. 5. As shown, cost file 106 includes a plurality of columns and a plurality of rows, one row for each type of item (e.g., 40 gigabyte hard drive, 60 gigabyte hard drive) to be auctioned. The columns may include item ID, $\beta$, base quantity, $\mu$, $\sigma$, $\lambda$, and d. The item ID is described above. Each row in the cost file can be used to determine the per-unit cost for a given bidder. The per-unit cost can be computed by the following exemplary equation.

$$\left[\beta_i + (1 - \beta_i) \times \frac{\text{base quantity}}{\text{lot quantity}}\right] \times U_{si}$$

where $U_{si}$ is a multivariate normal random variable. The dimensions of $U_{si}$ is the number of bidders by the number of items and is further defined by:

$$EU_{ai} = \mu_i$$

$$Cov(U_{si} U_{tj}) = \begin{cases} \sigma_i^2, & \text{if } s = t \text{ and } i = j; \\ \lambda \lambda \sigma_i \sigma_j, & \text{if } s = t \text{ and } i \neq j; \\ d_i \mu_i^2, & \text{if } s \neq t \text{ and } i = j \\ 0, & \text{otherwise.} \end{cases}$$

The value $\lambda_i \lambda_j$ is the correlation between two items for the same bidder, and $d_i$ is the correlation between two bidders for the same item. The absolute value of these values is less than one.

Figure 2:
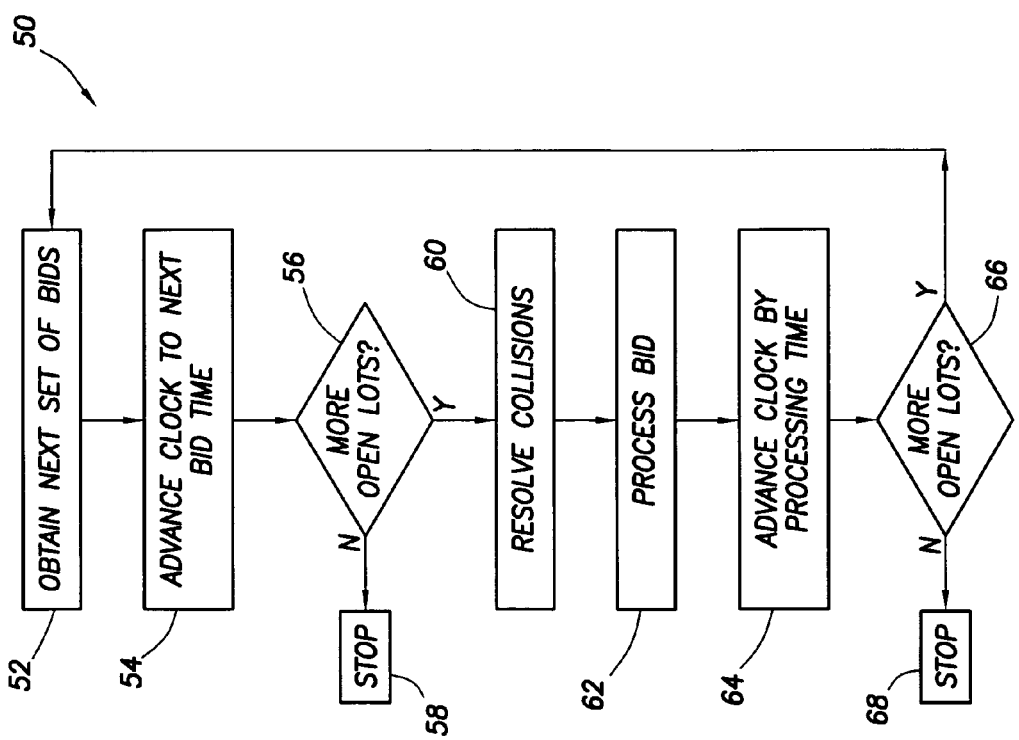
FIG. 2 depicts an exemplary auction simulation process.

FIG. 2 shows a process 50 for simulating an auction in accordance with exemplary embodiments of the invention. Process 50 takes into account time of the live auction, albeit at a faster pace. For example, a two hour auction may be simulated in a matter of milliseconds. Further, "bidders" are implemented as software constructs as are the various rules and parameters associated with the auction.

Figure 3:
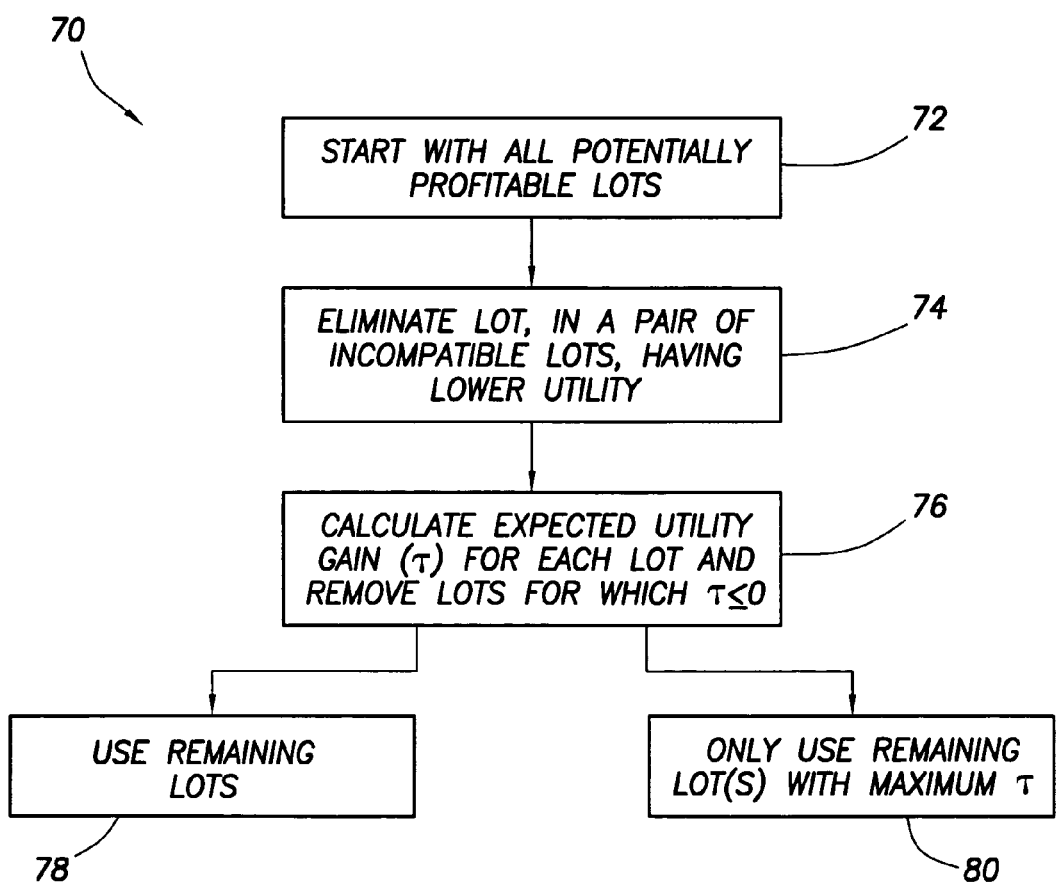
FIG. 3 depicts an exemplary process for determining viable lots for bidding in the simulated auction process of FIG. 2.

In block 52, the next set of bids is obtained and will be described in more detail with regard to FIG. 3. Referring to FIG. 3, bidders are assumed to only bid on lots at prices that would be profitable for the bidder. In block 72, given the current bid prices in the auction, the set of all potentially profitable lots are identified for each bidder. Further, when faced with a decision, a bidder is assumed to place his or her bids on the set of items that maximizes his or her utility given the current prices in the auction. Accordingly, per block 74 the utility of each potentially profitable lot for a given bidder is calculated. To the extent two incompatible lots are available for bidding at a price that would make both profitable for the bidder, the bidder is assumed to choose the lot having the higher utility. As such, incompatible lots having lower utility are removed from consideration.

In block 76, the expected utility gain value ($\tau$) is calculated for each lot. The parameter $\tau$ for a bidder indicates the expected difference between the utility associated with the set of lots the bidder is currently winning and the utility associated with the set of lots the bidder will win if his or her bid for the contemplated lot is accepted. The parameter $\tau$ takes into account possible retaliatory responses from other bidders. All lots having a $\tau$ that is less than or equal to a threshold (e.g., 0) are also removed from consideration. At 78, all remaining lots can be used from which to obtain a set of bids. Alternatively, at 80, only those remaining lots having the maximum value of $\tau$ are used from which to obtain a set of bids.

When obtaining the next set of bids, each bidder randomizes his or her bid submission time, using a random number generation process, subject to the constraint that a bidder does not permit a profitable lot to close without submitting a bid on that lot. Thus, the group of bidders submits at generally random times between the current simulated time and the scheduled closing times of the lots. One bidder may submit the next bid on a lot before all other bidders. The next set of bids obtained in block 52 in FIG. 2 includes the set of bids as well as the time at which each bidder submits a bid. Some bidders may be determined not to submit a bid.

Referring again to FIG. 2, in block 54 a simulated clock is advanced to the bid time that coincides with the next earliest time of a bidder's bid. For example, if bidder A submits a bid 5 minutes from now and that time is earlier than the time at which all other bidders submit bids, then the clock is advanced by 5 minutes. Of course, the auction design application 16 advances the simulated clock by 5 minutes at the processing speed of the processor 12.

If there are no more open lots (i.e., all lots are now closed in accordance with whatever sequencing rules are applied to the simulated auction), then the process stops at 58. If, however, at least one open lot still remains, control passes to block 60 in which any collisions are resolved. A collision refers to a situation where multiple bidders submit a bid for the same lot at the same time. To avoid this scenario, the auction design application 16 resolves such potential conflicts. In at least one embodiment, the auction design application 16 resolves collisions by randomly selecting one lot over the other incompatible lot for the bidder.

At block 62, the bid associated with the next earliest bidder is processed. In some embodiments, processing the bid may include recording the bid. In other embodiments, additional processing may be required such as resetting a closing time or, if permitted by the auction's rules, informing other bidders of the entered bid. The simulated clock is again advanced, this time by an amount of time that represents the expected processing time of the auction (i.e., the time that would be needed to process the bid in block 62).

In block 66, the auction design application 16 determines if bidding on any lot remains open. If not, the process stops at 68. If bidding on any lot remains open, control loops back to block 52 and the process repeats. The process thus repeats until bidding on all lots closes.

Once bidding on all lots closes and the simulated auction is thus completed, a metric, such as that noted above, is computed from the results. The results include the prices at which the purchaser is to pay the winning bidder for each lot. The simulation can be run again with a different set of parameters and sequencing rules. The metrics are estimated by determining the average value of the metric from multiple iterations of the simulation with different initial values ("seeds") from a random number generator while using the same parameters for the auction setup (cost parameters, other auction rules). This technique is known as the "Monte Carlo" technique. As noted above, this technique permits different auction configurations to be compared.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of evaluating sequencing rules for a multiple lot auction, comprising:
   obtaining a next set of bids from a plurality of simulated bidders;
   simulating the multiple lot auction using the next set of bids and a sequencing rule until simulated bidding on all lots is closed,
      wherein the simulating comprises:
         identifying a set of potentially profitable lots for each bidder based on current simulated bid prices;
         determining first and second utilities for each potentially profitable lot for each bidder wherein the first and second utilities are calculated as a function of a variable representing the bidder's aversion to risk, and the first utility is for a set of the profitable lots the bidder is currently winning and the second utility is for a set of the profitable lots the bidder will win if bids for the set are accepted;
         calculating a utility gain value based on a difference between the first and second utilities; and
         accepting bids for lots from the multiple lot auction based on the utility gain value;
   simulating the multiple lot auction using a different sequencing rule until bidding on all lots is closed; and
   comparing results of the simulated auctions with both sequencing rules, wherein the sequencing rules determine how closing times for accepting any bids are ordered among each of the lots.

2. The method of claim 1 wherein simulating the multiple lot auction with each sequencing rule comprises simulating a multiple lot, reverse auction.

3. The method of claim 1 wherein simulating the multiple lot auction with each sequencing rule further comprises processing a bid from the next set of bids.

4. The method of claim 3 wherein processing a bid from the next set of bids comprises at least one act selected from a group consisting of recording the bid, resetting a closing time, and permitting each simulated bidder to be informed of the bid being processed.

5. The method of claim 1 wherein obtaining the next set of bids comprises determining, for each of a plurality of simulated bidders, whether the bidder is to submit a bid, when the bidder is to submit a bid, and an amount of the bid.

6. The method of claim 5 wherein, if a simulated bidder submits a bid, the bid is submitted according to a random time interval.

7. The method of claim 1 wherein simulating the multiple lot auction comprises simulating auction time.

8. The method of claim 1 wherein comparing results comprises, for each simulated auction, determining a metric selected from a group consisting of total procurement cost of all of the lots in the multiple lot auction, average procurement cost per lot, and mean procurement cost per lot.

9. The method of claim 1, wherein the simulating comprises calculating $$\left[\beta_i + (1-\beta_i) \times \frac{\text{base quantity}}{\text{lot quantity}}\right] \times U_{si}$$

to determine a per unit cost for each item in a lot for each bidder, and $\beta_i$ is associated with the cost to supply an item i, and $U_{si}$ is a multivariate random variable having dimensions of a number of bidders by a number of items in the lot.

10. A storage medium containing code that can be executed by a processor and, when executed, causes the processor to:
   select a first sequencing rule that dictates how multiple lots in a multiple lot auction are to be auctioned to bidders;
   simulate a multiple lot auction using said first sequencing rule until bidding on all lots is closed wherein the processor is caused to simulate the multiple lot auction by identifying a set of potentially profitable lots for each bidder based on current simulated bid prices; determining first and second utilities for each potentially profitable lot for each bidder wherein the first and second utilities are calculated as a function of a variable representing the bidder's aversion to risk, and the first utility is for a set of the profitable lots the bidder is currently winning and the second utility is for a set of the profitable lots the bidder will win if bids for the set are accepted; calculating a utility gain value based on a difference between the first and second utilities; and accepting bids for lots from the multiple lot auction based on the utility gain value;
   evaluate results of the auction;
   select a second sequencing rule, simulate the multiple lot auction using said second sequencing rule until simulated bidding on all lots is closed, and evaluate results of the auction, wherein the first and second sequencing rules determine how closing times for accepting any bids are ordered among each lot of the multiple lot auction; and
   determine a metric for each simulated auction.

11. The storage medium of claim 10 wherein the metric comprises a metric selected from a group consisting of total cost of all of the lots in the multiple lot auction, average cost per lot, and mean cost per lot.

12. The storage medium of claim 10 wherein the code further causes the processor to compare the metrics from the simulated auctions.

13. The storage medium of claim 10 wherein the code further causes the processor to model behavior of a plurality of simulated bidders.

14. A system, comprising:
   a processor; and
   storage coupled to the processor and containing an application that is executable by the processor;
   wherein, when executed, the application causes the processor to simulate a multiple lot auction using a plurality of sequencing rules and determine a metric associated with each simulated multiple lot auction, the metric usable to evaluate results of the simulated multiple lot auction, wherein the plurality of sequencing rules determine how closing times for accepting any bids are ordered among each of lot of the multiple lot auction,
   and the processor is caused to simulate the multiple lot auction by identifying a set of potentially profitable lots for each bidder of a plurality of bidders based on current simulated bid prices; determining first and second utilities for each potentially profitable lot for each bidder wherein the first and second utilities are calculated as a function of a variable representing the bidder's aversion to risk, and the first utility is for a set of the profitable lots the bidder is currently winning and the second utility is for a set of the profitable lots the bidder will win if bids for the set are accepted; calculating a utility gain value based on a difference between the first and second utilities; and accepting bids for lots from the multiple lot auction based on the utility gain value.

15. The system of claim 14 wherein the processor prevents a simulated bidder from winning two lots that are incompatible.

16. The system of claim 14 wherein the processor eliminates lots from bidding by a simulated bidder if the expected utility gain value for that lot and bidder is less than a threshold.

17. The system of claim 14 wherein the processor eliminates lots from bidding by a simulated bidder if the expected utility gain value for that lot and bidder is less than a maximum value.

18. A system, comprising:
    means for simulating bids in a simulated multiple lot auction, wherein the simulating comprises identifying a set of potentially profitable lots for each bidder of a plurality of bidders based on current simulated bid prices; determining first and second utilities for each potentially profitable lot for each bidder wherein the first and second utilities are calculated as a function of a variable representing the bidder's aversion to risk, and the first utility is for a set of the profitable lots the bidder is currently winning and the second utility is for a set of the profitable lots the bidder will win if bids for the set are accepted; calculating a utility gain value based on a difference between the first and second utilities; and accepting bids for lots from the multiple lot auction based on the utility gain value;
    means for selecting a bid from the simulated bids for each of a plurality of lots in the multiple lot auction;
    means for sequencing bidding on each of the plurality of lots in accordance with a first sequencing rule, wherein the first sequencing rule determines how closing times for accepting any bids are ordered among each of the lots; and
    means for determining a first metric associated with the simulated multiple lot auction.

19. The system of claim 18 further comprising means for simulating the multiple lot auction using a second sequencing rule and means for determining a second metric associated with the simulated multiple lot auction when using the second sequencing rule.

20. The system of claim 19 further comprising means for comparing the first and second metrics.

21. The system of claim 18 further comprising means for simulating time in the multiple lot auction.

22. The system of claim 18 wherein the multiple lot auction comprises a reverse auction.

* * * * *

UNITED STATES PATENT AND TRADEMARK OFFICE
CERTIFICATE OF CORRECTION

PATENT NO. : 8,046,279 B2  
APPLICATION NO. : 10/757323  
DATED : October 25, 2011  
INVENTOR(S) : Kemal Guler et al.

Page 1 of 1

It is certified that error appears in the above-identified patent and that said Letters Patent is hereby corrected as shown below:

In column 7, line 57, in Claim 9, after "calculating" insert -- base quantity --.

In column 7, line 60, in Claim 9, delete " $\left[\beta_i + (1-\beta_i) \times \dfrac{\text{base quantity}}{\text{lot quantity}}\right] \times U_{si}$ " and insert -- $\left[\beta_i + (1-\beta_i)x\dfrac{base\ quantity_i}{lot\ quantity}\right]xU_{si}$ --, therefor.

Signed and Sealed this  
Nineteenth Day of June, 2012

David J. Kappos  
*Director of the United States Patent and Trademark Office*